United States Patent [19]

Knoche

[11] 4,320,818

[45] Mar. 23, 1982

[54] WHEELCHAIR BRAKE ASSEMBLY

[75] Inventor: Raymond E. Knoche, Creve Coeur, Mo.

[73] Assignee: Bohn & Dawson, St. Louis, Mo.

[21] Appl. No.: 114,846

[22] Filed: Jan. 24, 1980

[51] Int. Cl.³ .............................................. B60T 1/04
[52] U.S. Cl. .................... 188/2 F; 188/109; 188/167; 280/242 WC; 297/45; 297/DIG. 4
[58] Field of Search ............ 188/2 F, 166, 167, 109; 280/242 WC, 289 WC; 297/DIG. 4, 45

[56] References Cited

U.S. PATENT DOCUMENTS

| | | | |
|---|---|---|---|
| 633,266 | 9/1899 | Jamieson | 188/109 |
| 1,100,901 | 6/1914 | Moore | 297/DIG. 4 |
| 1,388,146 | 8/1921 | Scheibe | 297/45 X |
| 2,053,852 | 9/1936 | Tracy | 188/109 |
| 2,578,488 | 12/1951 | Placerean | 297/DIG. 4 |
| 2,792,874 | 5/1957 | Sundberg | 297/DIG. 4 |
| 3,302,757 | 2/1967 | Eagleson, Jr. et al. | 188/109 X |
| 3,529,700 | 9/1970 | Marshall | 188/109 |

FOREIGN PATENT DOCUMENTS 409263 9/1932 United Kingdom ............... 188/109

Primary Examiner—George E. A. Halvosa
Attorney, Agent, or Firm—Cohn, Powell & Hind

[57] ABSTRACT

This brake assembly, for use with a conventional foldable wheelchair, provides a pair of rearwardly extending brake arms connected to adjacent side frames underneath the seat. Each brake arm includes a transverse forward portion pivoted to the side frame and having a brake shoe biased into engagement with a drive wheel. The rearward portion of each brake arm is provided with a post engageable by the wheelchair seat to pivot the brake shoe out of engagement with the wheel when the seat is depressed and moved downwardly by the weight of an occupant. The wheelchair side frames are connected by a tension spring to ensure that the brake is engaged when the wheelchair is unoccupied.

11 Claims, 6 Drawing Figures

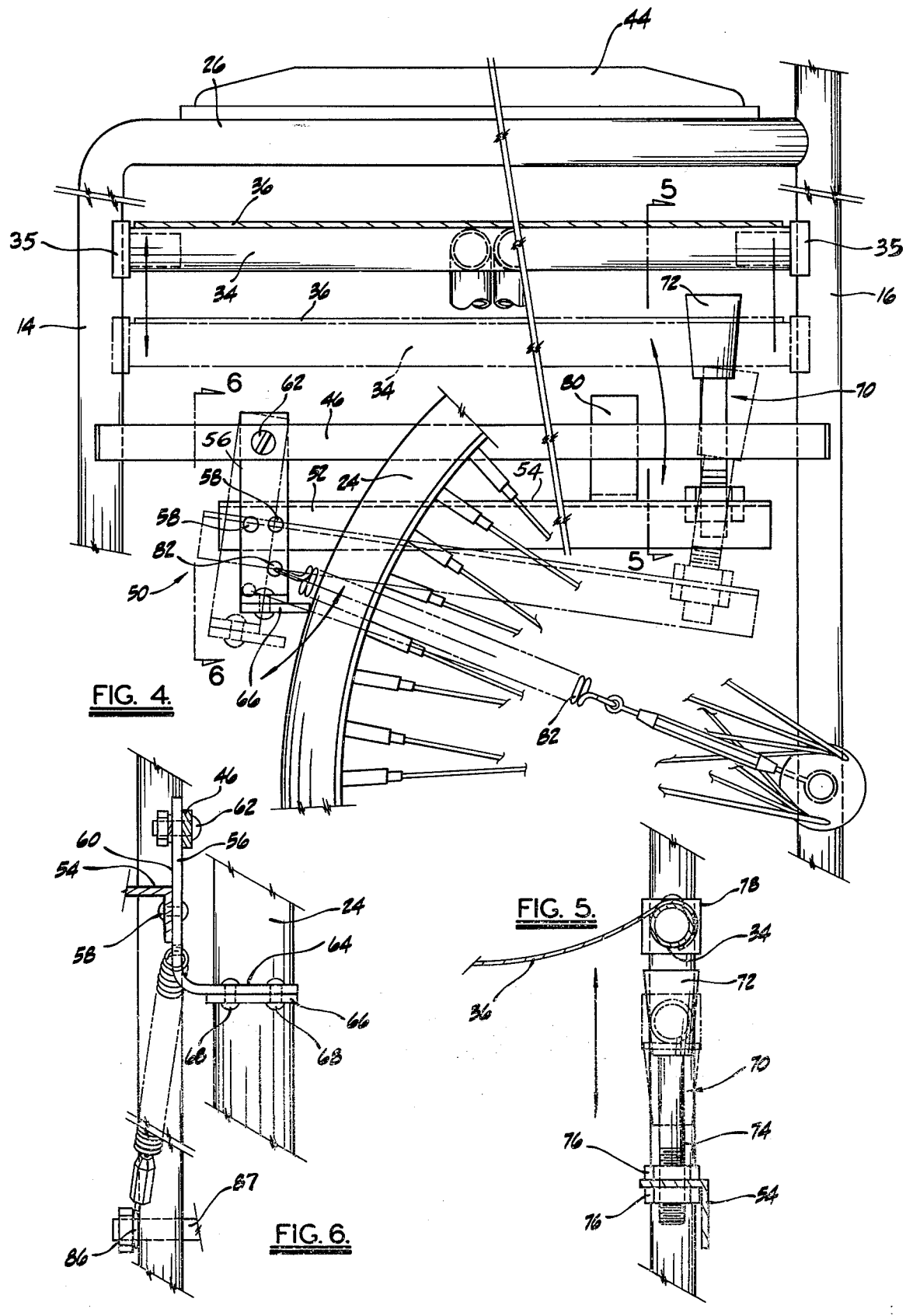

WHEELCHAIR BRAKE ASSEMBLY

BACKGROUND OF THE INVENTION

This invention relates generally to wheelchair brake assemblies and particularly to an assembly which is released automatically when the user becomes seated.

Conventional wheelchairs of the type which are folded for storage purposes are invariably fitted with hand-operated brakes. These brakes engage the main drive wheels of the wheelchair, and are applied by the user, or a helper, before the user is seated in the wheelchair so that the wheelchair is stabilized. The brakes are released by hand once the user is seated to permit the wheelchair to become mobile. They are re-applied when the user wishes to leave the wheelchair.

Brakes of this conventional type are adequate when the user is not seriously physically handicapped and is in complete control of his mental faculties. However, when the user is handicapped to the point of being unable to operate the hand brake they are quite inadequate. A seriously handicapped user, attempting unaided to get into a wheelchair which is not locked into a stationary position is faced with a difficult and dangerous task. Further, an unbraked wheelchair, which is used as a temporary support to assist in walking also presents a serious hazard to the user.

Because of this, attempts have been made to provide an alternative system which remains in a braked condition automatically when not being used, until the user becomes seated. When the user becomes seated the brake is released by the weight of the user.

The most pertinent known disclosure of a wheelchair braking system of this type is to be found in U.S. Pat. No. 3,529,700. This system relies for its operation on the use of chains or rod linkages which are connected between a set of rigid actuating bars attached to the seat panel, and such linkages operate a pair of transverse brake levers which engage the main wheels.

The present brake assembly represents an improvement over this and other known systems as will now be described.

SUMMARY OF THE INVENTION

This brake assembly, when used in conjunction with a conventional wheelchair, provides a braking system which is engaged automatically at all times when the wheelchair is not occupied. The brake is released automatically when occupied.

The brake assembly is for use with a folding wheelchair of the type having opposed side frames connected by a collapsible cross frame, each side frame carrying a drive wheel and a seat portion extending between the side frames, said seat portion being movable downwardly under the weight of the user. The brake assembly, which provides the improvement, includes at least one brake arm having forward and rearward portions. The brake arm is pivotally mounted at the forward portion to an adjacent side frame and includes brake means, spaced from the pivot axis and carried by the forward portion of the brake arm for engagement with the drive wheel and engagement means, carried by the rearward portion for engagement by the downwardly movable seat, for movement into a brake disengaged condition. Biasing means is provided between the brake arm and the side frame tending to urge the brake means into engagement with the wheel.

In one aspect of the invention, resilient means extends between the side frames tending to urge said side frames together and assure a braked condition when the chair is unoccupied.

In another aspect of the invention, the brake arm is disposed inwardly of the frame and includes a longitudinal portion and a transverse portion, said transverse portion having one end providing the pivotal mounting, and the other end providing the brake means.

In another aspect of the invention, the transverse portion extends outwardly of the frame into engagement with the wheel.

In yet another aspect of the invention, the engagement means includes an upwardly extending post portion engageable with the seat portion when the seat portion moves downwardly.

In another aspect of the invention the post portion is lengthwise adjustable.

In still another aspect of the invention, the longitudinal arm is provided with guide means to preclude outward movement of the brake arm.

In yet another aspect of the invention, the wheelchair includes opposed pairs of identical brake assemblies provided for engagement with each wheel.

BRIEF DESCRIPTION OF THE DRAWINGS

FIG. 4 is an enlarged fragmentary side elevational view showing details of the brake assembly;

FIG. 5 is a cross sectional view taken on line 5—5 of FIG. 4, and

FIG. 6 is a cross sectional view taken on line 6—6 of FIG. 4.

DESCRIPTION OF THE PREFERRED EMBODIMENT

Figure 1:
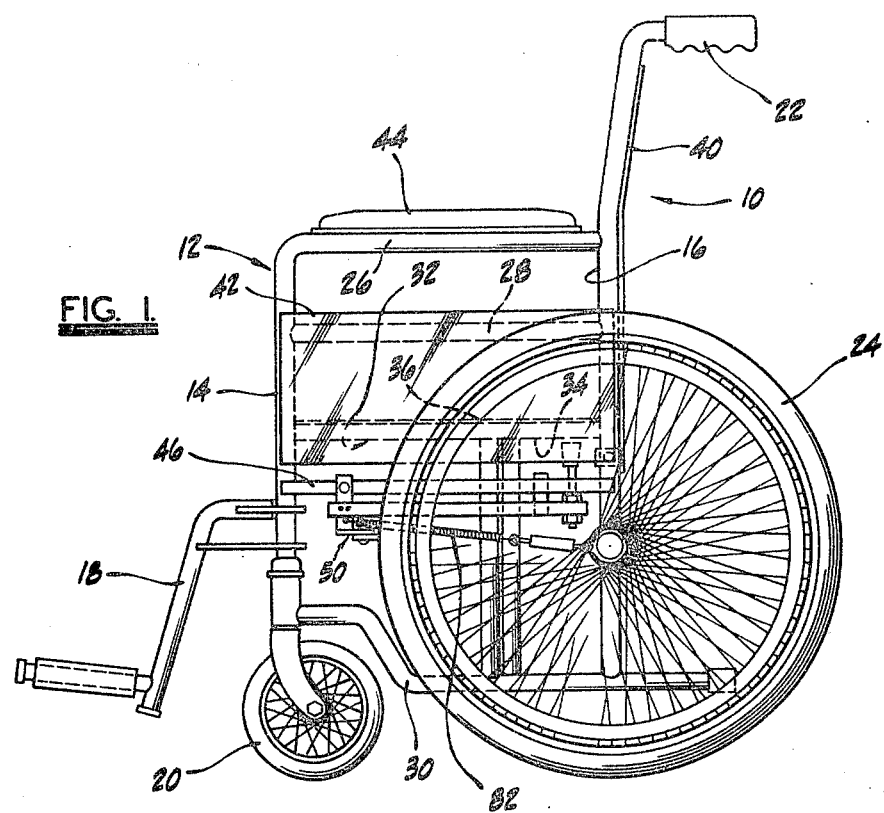
FIG. 1 is a side-elevational view of a conventional folding wheelchair incorporating the improved brake assembly.

Referring now by reference numerals to the drawings and first to FIG. 1, it will be understood that the wheelchair, generally indicated by numeral 10, is conventional in that it includes a pair of opposed side frames 12 each having front and rear upright members 14 and 16. The front member 14 carries footrest portions 18 and terminates in a mounting for the front wheel 20. The rear member 16 provides push handles 22 at its upper end and includes stub axles carrying the main drive wheels 24. The upright members 14 and 16 are interconnected by a plurality of longitudinal members including upper horizontal members 26 and 28, a lower member 30 and an intermediate member 46.

The wheelchair 10 is provided with a seat portion 12, which includes horizontal members 34 slidingly mounted between the front and rear upright members 14 and 16 and interconnected by a foldable flexible panel 36 as by fasteners. The folding of the wheelchair 10 from an operative condition, shown in FIG. 2, to an inoperative condition, shown in FIG. 3, is effectuated by the provision of a pair of cross members 38 pivoted at their center to provide an X-frame. The upper ends of the cross members 38 are rigidly connected to horizontal frame members 28 which include relatively rotatable end plugs 35 of teflon, or the like, arcuately formed for sliding connection to said upright members 14 and 16.

Members 38 are rotatably connected at their lower end to the lower frame member 30. In this way, the opposed side frames 12 can be urged toward each other as shown in FIG. 3 with the result that the seat portion horizontal sliding members 38 move upwardly, as the upper ends and lower ends of the cross members 38 are moved transversely toward each other into a folded or collapsed condition.

The side frames 12 of the wheelchair 10 are also interconnected by a back panel 40 and each side frame includes a side panel 42, connected between upright members 14 and 16 and an arm rest 44 mounted to the upper horizontal member 26. Conventional wheelchairs also include a hand-operated brake system (not shown), which should be used as a parking brake when the wheelchair is occupied. This system is mounted to the intermediate horizontal member 46 extending between, and rigidly connected to, upright members 14 16. In the preferred embodiment this intermediate member 46 also provide a mounting for the automatic brake assembly, which is generally indicated in FIG. 1 by numeral 50 and which, in the preferred embodiment, is mounted to each side frame 12. The brake assembly 50 will now be described with particular reference to FIGS. 4, 5 and 6.

Each brake assembly 50 includes a brake arm 52 having a rearwardly extending longitudinal portion 54 and a forward transverse portion 56 rigidly attached thereto as by fasteners 58. As shown clearly in FIG. 6, the transverse portion 56 includes an upright leg 60, which is pivotally attached to the side frame horizontal member 46 as by a pivot fastener 62, and an outstanding leg 64 having a rearwardly projecting portion 66 attached thereto as by fasteners 68 to provide a brake shoe engageable with the wheel 24.

The transverse portion 56 and longitudinal portion 54 of the brake arm 52 cooperate to provide a bell crank, and the longitudinal portion 54 is provided at its rearward end with an upwardly projecting post 70 providing a stop and constituting means engageable by the seat portion 32 as said seat portion moves downwardly. As shown in FIG. 5 the post 70 includes a head 72 and a threadedly adjustable stem 74 connected, as by nuts 76, to said brake arm longitudinal portion 54. This adjustment permits the point of engagement between the post 70 and the seat portion 32 to be accurately determined so that the brake disengagement can likewise be accurately determined. In the embodiment shown, the rear end of longitudinal portion 54 is cranked slightly in the horizontal plane so that the stop head 72 is aligned directly below the seat portion sliding member 34. Also in the embodiment shown, the brake arm longitudinal portion 54 includes a lug 80, constituting a guide means, which s fixedly attached to said brake arm as by fasteners (not shown). The lug 80 is disposed intermediate the transverse portion 56 and the post 70, adjacent the side frame cross member 46, to facilitate the maintenance of the alignment of the stop 70 and preclude outward movement of the brake arm 52.

The brake arm 52 is attached to the rearward portion of the wheelchair 10 by means of an adjustable tension spring 82 which, in the preferred embodiment, is connected at the front end to an aperture 82 provided on the brake arm transverse portion 56 and at the rear end to a ring member 86 mounted on the axle 87 of the wheel 24.

Figure 2:
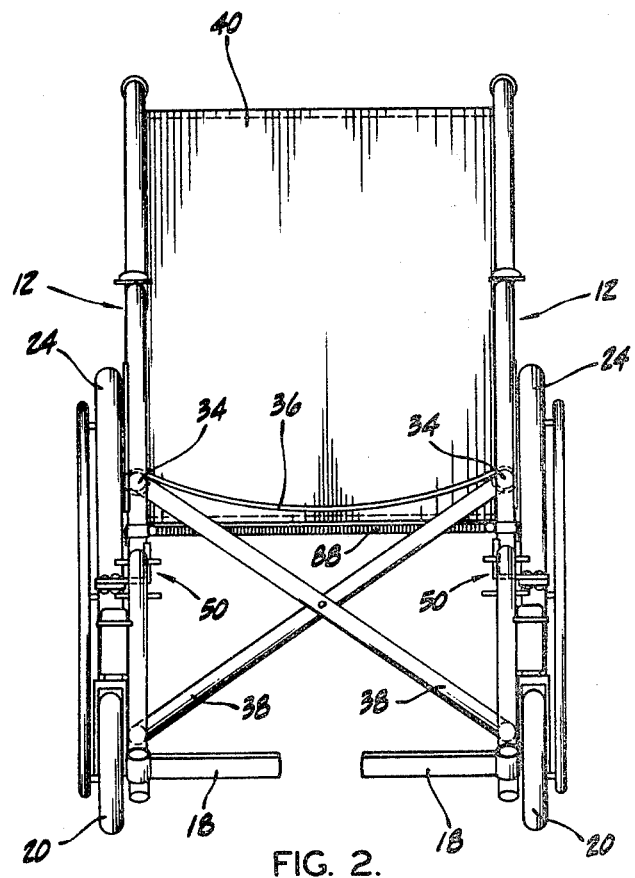
FIG. 2 is a front-elevational view of the wheelchair in its operative condition.
Figure 3:
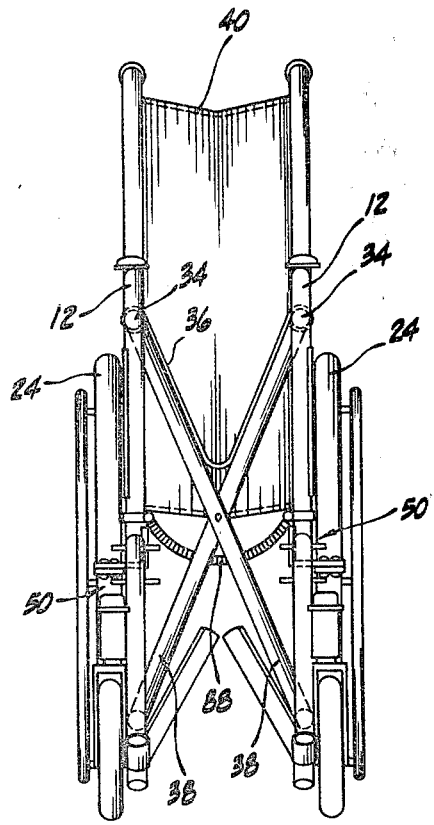
FIG. 3 is a similar view showing the same wheelchair in its folded condition.

As clearly shown in FIGS. 2 and 3 the side frames 12 are interconnected by a transverse tension spring 88. The spring 88 is connected to each rear upright member 14 as by clamps (not shown) and is of a length such that said spring, which constitutes a resilient means, tends to urge said side frames 12 toward each other. Because of this arrangement, the spring 88 tends to urge said seat sliding members 34 away from engagement with the head of the stop 70 when the wheelchair is unoccupied.

It is thought that the structural features and functional advantages of this automatic wheelchair brake assembly have become fully apparent from the foregoing description of parts but for completeness of disclosure the operation of the device will be briefly described.

The construction of conventional folding wheelchairs, of the type with which the automatic brake assembly 50 can be used, is such that the seat arrangement consists essentially of a flexible panel 36 and sliding horizontal members 34. This arrangement provides that the wheelchair is opened up by pulling the frames apart thereby expanding the X-frame cross members 38 attached to each frame and when this occurs the sliding members 34 move downwardly. Because of the provision of the tension members 82 between each brake assembly 50 and the wheelchair frame 12 the brake shoe 66 of each assembly is normally engaged with the wheel 24. When the wheelchair 10 is almost in its fully opened position, the sliding members 36 almost engage the brake assembly actuating post 70. This condition of non-engagement is assured by the existence of the transverse spring 88 between the wheelchair side frames 12, which tends to exert an inward pressure on said side frames and each brake assembly remains in the "on" condition, with the result that the wheelchair is stable with the drive wheels locked.

This locked condition is maintained until the post 70 is depressed and moves downwardly sufficiently (see FIG. 4) to disengage the brake shoe 66. This occurs when the weight of the user is applied to the seat panel 36, which results in the movement of the sliding members 34 downwardly into the position shown in phantom outline. The length of the post 70 is adjustable so that the point of engagement is accurately determined. When this position is reached each brake arm 52 rotates about its pivot fastener 62 resulting in disengagement of the brake shoe 66.

This unlocked condition is maintained until the weight of the occupant is removed from the wheelchair seat portion 32 at which time the sliding member 36 moves upwardly permitting the brake arm 52 also to move upwardly until a condition is reached wherein the brake shoe 66 engages and again locks the wheel 24. This condition is reached at a very early stage of the upward movement of the former occupier of the seat and is assisted by the sideways force exerted by the spring 88 which tends to draw the side frames 12 together.

I claim as my invention:

1. A brake assembly for a folding wheelchair having opposed side frames connected by a collapsible cross frame, each side frame carrying a drive wheel and having a seat portion extending between the side frames and movable downwardly under the weight of a user, the brake assembly comprising:

(a) at least one brake arm, extending in a fore and aft direction relative to the wheelchair, and having forward and rearward portions, said arm being pivotally mounted at the forward portion to an adjacent side frame, the brake arm including:

1. brake means spaced from the pivot axis and carried by the forward portion for engagement with the wheel carried by said adjacent frame, and
2. engagement means carried by the rearward portion and having a free end spaced from the seat portion until the seat portion is moved downwardly under the weight of a user, said free end being engagable with the downwardly movable seat portion to rotate the brake arm and disengage the brake means, and (b) biasing means between the arm and the frame tending to urge the brake means into engagement with the wheel.

2. A brake assembly for a folding wheelchair as defined in claim 1, in which:
(c) the brake arm engagement means is disposed inwardly of the adjacent side frame, and the brake arm includes a longitudinal portion and a transverse portion, said transverse portion having one end providing the pivotal mounting and the other end providing the brake means.

3. A brake assembly for a folding wheelchair as defined in claim 2, in which:
(d) the transverse portion brake means extends outwardly of the adjacent side frame.

4. A brake assembly for a folding wheelchair as defined in claim 2, in which:
(d) the engagement means includes a lengthwise adjustable, upwardly extending post portion having a free upper end engageable with the seat portion.

5. A brake assembly for a folding wheelchair as defined in claim 1, in which:
(c) the brake arm includes a longitudinal portion disposed inwardly of the side frame, and
(d) guide means, carried by said longitudinal portion, is disposed inwardly adjacent to the side frame to preclude outward movement of said longitudinal portion.

6. A brake assembly for a folding wheelchair having opposed side frames connected by a collapsible cross frame, each side frame carrying a drive wheel and having a seat portion having end portions, the seat portion extending between the side frames and movable downwardly under the weight of a user, the brake assembly comprising:
(a) at least one brake arm, extending in a fore and aft direction relative to the wheelchair, and having forward and rear portions, said arm being pivotally mounted at the forward portion to an adjacent side frame, the brake arm including:
1. brake means spaced from the pivot axis and carried by the forward portion for engagement with the wheel carried by said adjacent frame, and
2. engagement means carried by the rearward portion and having a free end for engagement with the downwardly movable seat portion to rotate the brake arm and disengage the brake means,
(b) biasing means between the arm and the frame tending to urge the brake means into engagement with the wheel, and
(c) resilient means extending between the opposed side frames tending to urge said side frames together and to move said seat end portions upwardly.

7. A collapsible wheelchair comprising:
(a) a pair of opposed side frames, each including:
1. front and rear upright members, and
2. at least one longitudinal member rigidly connected between said upright members,
(b) a seat portion including:
1. a pair of sliding members each connected between the front and rear members of one side frame for vertical sliding movement, and
2. a foldable flexible panel extending between and connected to said sliding members,
(c) an X-frame connected between said side frames to permit said frames to move toward each other, said X-frame having upper ends connected to said sliding members,
(d) a tension spring operatively connected between the side frames tending to urge said frames together and to urge said seat portion sliding members upwardly,
(e) a pair of drive wheels, each carried by one of the side frames, and
(f) a pair of brake assemblies, each disposed adjacent a side frame and including:
1. a brake arm pivotally mounted to an adjacent side frame, said arm having a rearwardly extending longitudinal portion and a forwardly disposed transverse portion,
2. a brake shoe carried by said transverse portion adjacent one of said drive wheels,
3. a tension spring having a forward end attached to the brake arm and a rearward end attached to said adjacent side frame to urge said brake shoe into engagement with said adjacent wheel, and
4. an upwardly projecting stop carried by the rearward portion of the brake arm and having a free end engageable by the sliding members when the seat portion is moved downwardly under the weight of a user to rotate the brake arm and disengage the brake shoe.

8. A wheelchair as defined in claim 7, in which:
(g) the upwardly projecting stop is lengthwise adjustable to selectively determine the height of the free end.

9. A collapsible wheelchair comprising:
(a) a pair of opposed side frames, each including:
1. a front and rear upright members, and
2. at least one longitudinal member rigidly connected between said upright members,
(b) a seat portion including:
1. a pair of sliding members each connected between the front and rear members of one side frame for vertical sliding movement, and
2. a foldable flexible panel extending between and connected to said sliding members,
(c) an X-frame connected between said side frames to permit said frames to move toward each other, said X-frame having upper ends connected to said sliding members,
(d) a tension spring operatively connected between the side frames tending to urge said frames together,
(e) a pair of drive wheels, each carried by one of the side frames,
(f) a pair of brake assemblies, each disposed adjacent a side frame and including:
1. a brake arm having a rearwardly extending longitudinal portion and a forwardly disposed transverse portion,
2. a brake shoe carried by said transverse portion adjacent one of said drive wheels, 3. a tension spring having a forward end attached to the brake arm and a rearward end attached to said adjacent side frame to urge said brake shoe into engagement with said adjacent wheel,
4. an upwardly projecting stop carried by the rearward portion of the brake arm and engageable by the sliding members when the seat portion is moved downwardly under the weight of a user to rotate the brake arm and disengage the brake shoe, and (g) each brake arm being provided with an upwardly projected guide member engageable with the adjacent side frame to preclude outward movement of the brake member during rotation thereof.

10. A wheelchair as defined in claim 7, in which:
(g) the forward end of each brake assembly tension spring is attached to the brake arm transverse portion below the pivot axis and the rearward end is attached to the rear upright member of the side frame.

11. A collapsible wheelchair comprising:
(a) a pair of opposed side frames, each including:
 1. front and rear upright members, and
 2. at least one longitudinal member rigidly connected between said upright members,
(b) a seat portion including:
 1. a pair of sliding members each connected between the front and rear members of one side frame for vertical sliding movement, and
 2. a foldable flexible panel extending between and connected to said sliding members,
(c) an X-frame connected between said side frames to permit said frames to move toward each other, said X-frame having upper ends connected to said sliding members,
(d) a pair of drive wheels, each carried by one of the side frames, and
(e) at least one brake assembly, disposed adjacent a side frame and including:
 1. a brake arm, extending in a fore and aft direction relative to the wheelchair, and pivotally mounted to an adjacent side frame, said arm having forwardly and rearwardly disposed portions,
 2. a brake shoe carried by said forward portion adjacent one of said drive wheels,
 3. biasing means between the arm and the frame tending to urge said brake shoe into engagement with said adjacent wheel, and
 4. engagement means between the seat portion and the brake arm rearwardly extending portion, attached to one of said portions and having a free end spaced from the other of said portions until the seat portion is moved downwardly under the weight of a user, said free end being engagable with said other portion to rotate the brake arm and disengage the brake shoe.

* * * * *